United States Patent
Casiraghi et al.

(10) Patent No.: US 11,624,008 B2
(45) Date of Patent: Apr. 11, 2023

(54) COMPOSITION USEFUL AS A PRESSURE SENSITIVE ADHESIVE, ITS USE AND ADHESIVE ARTICLES COMPRISING IT

(71) Applicant: IGM RESINS ITALIA S.R.L, Milan (IT)

(72) Inventors: Angelo Casiraghi, Milan (IT); Enzo Meneguzzo, Sesto Calende (IT); Gabriele Norcini, Comabbio (IT)

(73) Assignee: IGM RESINS ITALIA S.R.L, Milano Mi (IT)

( * ) Notice: Subject to any disclaimer, the term of this patent is extended or adjusted under 35 U.S.C. 154(b) by 21 days.

(21) Appl. No.: 17/342,829

(22) Filed: Jun. 9, 2021

(65) Prior Publication Data
US 2021/0292454 A1 Sep. 23, 2021

Related U.S. Application Data

(63) Continuation of application No. 16/475,596, filed as application No. PCT/EP2017/081358 on Dec. 4, 2017, now abandoned.

(30) Foreign Application Priority Data

Jan. 5, 2017 (EP) .................. 17150391

(51) Int. Cl.
| | | |
|---|---|---|
| *C08F 2/46* | (2006.01) | |
| *C08F 2/50* | (2006.01) | |
| *C08G 61/04* | (2006.01) | |
| *C09J 133/08* | (2006.01) | |
| *C08F 220/18* | (2006.01) | |

(52) U.S. Cl.
CPC ........ *C09J 133/08* (2013.01); *C08F 220/1808* (2020.02)

(58) Field of Classification Search
CPC . C09J 133/08; C08F 220/1808; C08F 220/14; C08F 220/286; C08F 220/06; C08F 228/04
USPC ............ 522/8, 7, 6, 189, 184, 71, 1; 520/1
See application file for complete search history.

(56) References Cited

U.S. PATENT DOCUMENTS

2016/0208132 A1* 7/2016 Masuda ............ C09D 135/02

FOREIGN PATENT DOCUMENTS

| CN | 104395275 | 3/2015 | |
|---|---|---|---|
| EP | 2878606 | 8/2015 | |
| EP | 2858969 | 9/2016 | |
| WO | 2013182533 | 12/2013 | |
| WO | WO-2013182533 A1 * | 12/2013 | ............ B05D 1/00 |

OTHER PUBLICATIONS

International search report and written opinion issued by the EPO on Jan. 17, 2018 for corresponding PCT application No. PCT/EP2017/081358.
European priority search report issued by the EPO for EP 17150391 dated Jun. 15, 2017.
International preliminary report on patentability issued by the EPO dated Jul. 9, 2019 for PCT/EP2017/081358.
Office Action issued by the CN Patent Office dated Mar. 4, 2021 for corresponding CN application No. 201780082323.1 together with reporting letter and suggestions of the CN local Agent.

* cited by examiner

*Primary Examiner* — Jessica Whiteley
(74) *Attorney, Agent, or Firm* — Silvia Salvadori

(57) ABSTRACT

The present invention relates to a composition useful for manufacturing pressure sensitive adhesives, "PSAs", and the use of said PSAs, especially in the medical field. The invention also relates to a method for manufacturing adhesive articles comprising the composition of the invention and to said articles. The invention is further directed to medical articles comprising the composition of the invention.

8 Claims, 1 Drawing Sheet

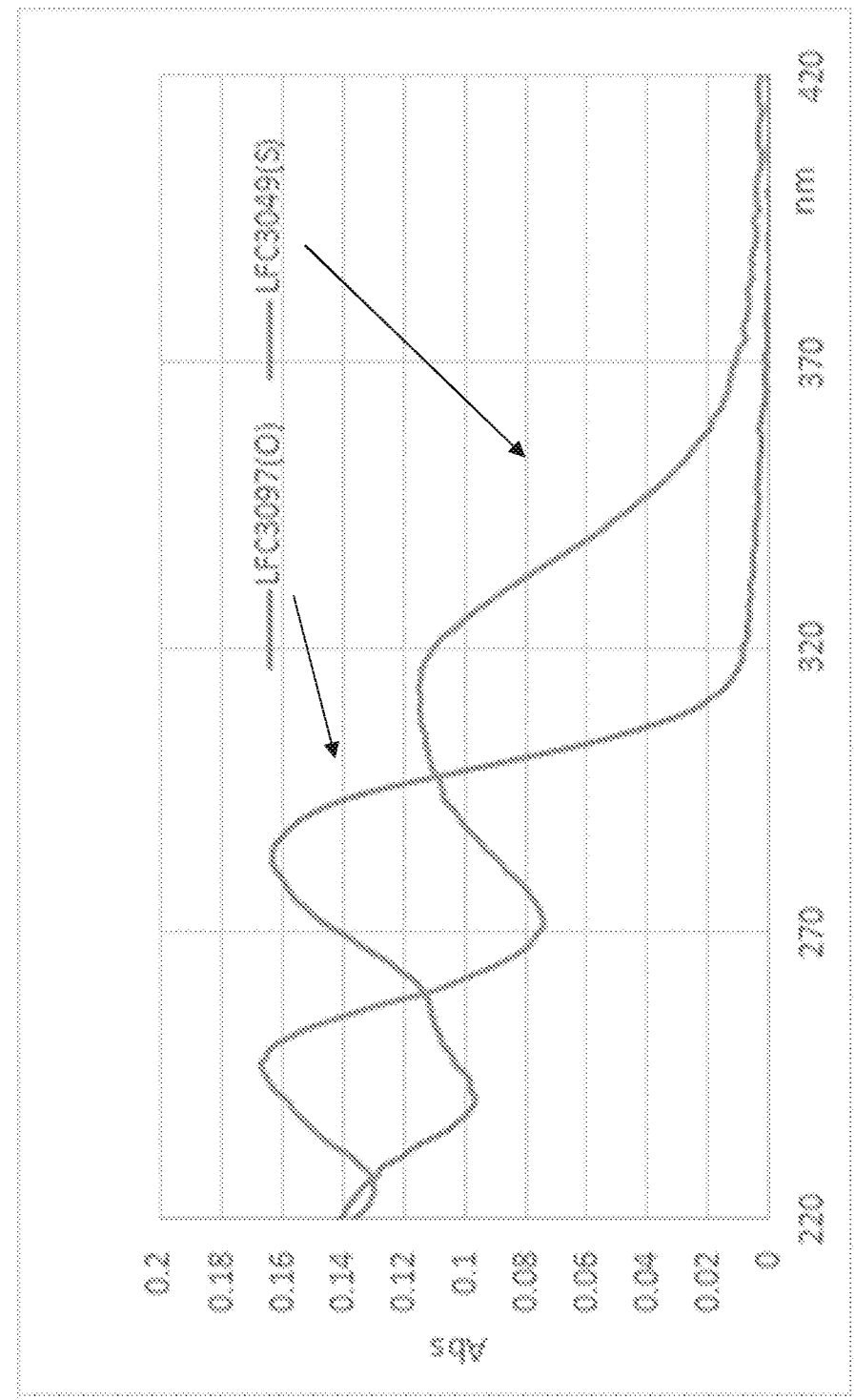

COMPOSITION USEFUL AS A PRESSURE SENSITIVE ADHESIVE, ITS USE AND ADHESIVE ARTICLES COMPRISING IT

This non-provisional application is a continuation of U.S. patent application Ser. No. 16/475,596 filed on Jul. 2, 2019, which is U.S. National Stage of PCT/EP2017/081358 filed on 4 Dec. 2017, which claims priority to and the benefit of European Application No. 17150391.5 filed on 5 Jan. 2017, the contents of which are incorporated herein by reference in their entireties.

SUMMARY OF THE INVENTION

The present invention relates to a composition useful for manufacturing pressure sensitive adhesives, "PSAs", and the use of said PSAs, especially in the medical field. The invention also relates to a method for manufacturing adhesive articles comprising the composition of the invention, to said articles, and to the use of specific photoinitiators in said method. The invention is further directed to medical articles comprising the composition of the invention.

Technical Background and Prior Art

A "pressure sensitive adhesive" or a "pressure sensitive adhesive composition" (PSA) is a permanently tacky composition that is able to adhere to a given substrate when a pressure is applied.

PSAs are used in a variety of applications. For instance PSA are used for the manufacture of adhesive tapes for packaging or office purposes, wound or surgical dressings, athletic tapes, plasters, tapes or tabs used in adhering medical devices such as sensors, electrodes to the human skin. The versatility of PSA permits it to adhere to inorganic materials such as glass but also to organic materials such as skin.

Thanks to their great workability, PSA adhesive tapes have been widely used as electrical insulation, wrapping and protection, or to stack the optical films or attach the optical films to an adherent such as a liquid crystal panel. Adhesive tapes have been also useful in a variety of industrial and automotive applications. Double-side adhesive tapes having a PSA on both sides have been found useful in bonding together substrates of similar or dissimilar materials.

Another application of PSAs is the prevention of surface damage in transporting, storing aging and constructing articles (painted automobiles and their components, or metal plates such as steel plates and molded articles therefrom), techniques are known such as adhering protection sheets to the surfaces for protection. A surface protection sheet used for such purposes is generally constructed to have a PSA layer on one face of a substrate sheet so that it can provide protection when adhered via PSA to a surface. PSAs are designed for either permanent, repositionable or removable applications. Removable adhesives are intended to form a temporary bond with surface and the tape can be removed without leaving residue on surface. Applications for removable pressure sensitive adhesives are for office purposes such as labels, promotional graphics materials (address labels), software media labels, note sticks, surface protection. A removable PSA can be used also in adhering medical devices such as electrodes, wearable sensors because it is able to adhere to organic surfaces like human skin. Moreover PSAs can be used in the fields of medical tapes, wound of surgical dressing or wound care dressings, transdermal drug patches, catheter etc.

Repositionable PSAs also exist, which are similar to removable adhesives but permit to be removed from a surface and applied again to the same or to a different surface, without losing effectiveness or leaving residue. This type of adhesive can be removed and reapplied more times or repositioned before to obtain a greater adhesion.

On the contrary, permanent PSAs are used for the manufacture to adhere in a lasting way, for instance to inorganic materials such as glass, plastic or metal and exhibit high adhesion values. Examples include automotive interior trim assembly, the electronic equipment to fix electronic components, durable adhesives, packaging labels, adhesive films.

PSAs include a number of polymeric raw materials, such as natural rubber, different types of synthetic rubber such as styrene-butadiene and ethylene copolymer, polyvinyl-ether, polyurethane, acrylic, silicones and ethylene-vinyl acetate copolymers. However, PSA compositions are usually derived from rubber-based, (meth)acrylic monomers, modified (meth)acrylic-silicone monomers.

Rubber based PSAs provide good initial adhesion particularly to plastics and are used especially to achieve adhesion in high-moisture applications. A important drawback of natural rubber is its high costs that is why, fillers are usually added. However, fillers modify the properties if the rubber and, in any case, long term aging is low.

Acrylic based PSAs are made from alkyl esters of (meth) acrylic acid and provide excellent adhesive properties. The monomer composition and the molecular weight of the polymers determine most of the adhesive's properties. They can be free from other components and this make them less irritating when applied on the skin and that is why are often preferred for medical applications.

Also, acrylic based PSAs provide good resistance to solvents, UV light, elevate temperatures and chemical reagents. Acrylic PSAs also show long-term aging and environmental resistance.

Modified acrylic PSAs, which are formulated from acrylic polymers incorporating additional components such as high molecular linear polysiloxane polymers, gain tack and adhesion but they have a loss of internal strength and environmental stability.

As typical significant properties of PSAs, initial tack, shear resistance and peel strength are usually considered.

The "initial tack" is referred to immediate holding power upon contact with the surface. It is a measure of the force required to remove the tape and adhesive from the surface and denotes the measure of initial attraction of the adhesive to the substrate. It is possible to tune the degree of tack modifying the adhesive components. A high initial tack will exhibit a high level of adhesion but may not be removed cleanly.

The "shear resistance" is a measure of the internal cohesive strength of the PSA and it is an indication of how soft a PSA is. A low-shear PSA is soft and has a higher initial tack. On contrary high-shear PSA has a good internal strength and a lower initial tack. The "peel adhesion" is the force required to remove a PSA tape from a test panel, at a controlled angle and at a standard rate and condition. It is a measure of the bond strength between an adhesive and a surface and can be set by manufactures. As the softness of PSA increased the peeling force decreased.

In order to improve certain properties of PSAs, the linear polymer can be crosslinked after its application to form a polymeric three dimensional network.

Usually, PSAs are made of a blend of (meth)acrylates monomers including a radical initiator which permits to copolymerize radically. The radical reaction starts when the initiator decomposes forming radicals. The radical reaction can be carried out in different way, such as heat or light (UV).

For hot-melt PSAs, the crosslinking process is obtained through the addition of an organic peroxide prior to the coating operation and applying heat. However, there are limitations to hot-melt PSAs such as insufficient high-temperature resistance and low chemical resistance which may be attributed to the thermoplastic nature of the hot-melt adhesive.

For UV PSAs, the network can be obtained adding a photoinitiator in the coating formulation and irradiating with the appropriate light source.

As said, PSAs have been used for a broad range of applications in tapes, drapes, labels and decals. However, they have a major market share in health care and biomedical applications.

Many film/PSAs combinations are occlusive, thus sealing the surface so that not only are contaminants isolated from the surface but also moisture from the skin itself is sealed beneath the covered area.

The focus in the development of medical PSAs is on adhesion, on biocompatibility and on permeability for vapor or air. Medical PSAs must be highly tolerable, breathable products and must also be characterized by a very good release from the skin.

Acrylate PSAs are generally permeable to water vapor. The degree of moisture permeability varies depending on the thickness of the PSA coating and the PSA formulation.

There is a need for developing novel PSAs with improved properties, such as finely tunable tack and adhesion and, importantly, are highly breathable.

OBJECTS OF THE INVENTION

It is an object of the present invention to provide a novel composition useful as a pressure sensitive adhesive (PSA) with improved tack and adhesive properties, with respect of the prior art PSAs.

It is a further object of the invention to provide a novel PSA with high breathability and skin compatibility.

It is a further object of the invention to provide a process for the preparation of the novel composition above.

It is a further object of the invention to provide the use of said PSA in adhesive articles, especially in the medical field, as well as articles comprising the PSA of the invention.

BRIEF DESCRIPTION OF THE FIGURE

FIG. 1 shows the UV-visible spectrum comparing the absorption of 4-benzoyl-4'-(2-methyl-propenoyl)-diphenylether and 4-benzoyl-4'-(2-methyl-propenoyl)-diphenylthioether, in acetonitrile.

DESCRIPTION OF THE INVENTION

According to one of its aspects, the invention relates to novel composition comprising:
a. at least one copolymerizable (meth)acrylic monomer;
b. optionally, at least one copolymerizable non-acrylic monomer;
c. at least one copolymerizable photoinitiator;
d. optionally, a solvent; and
e. optionally, one or more non-copolymerizable photoinitiators;

characterized in that the at least one copolymerizable photoinitiator (c) is selected from benzophenone(meth)acrylate and a compound of formula (I)

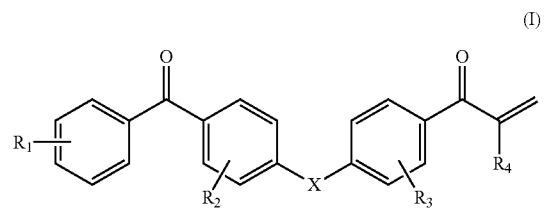

wherein
X is selected from S and NR';
R' is selected from hydrogen and linear or branched $C_{1-10}$ alkyl groups;
$R_1$, $R_2$ and $R_3$, each independently, are selected from hydrogen, $C_{1-6}$ alkyl groups, halogens, amino groups, nitro groups, nitrile groups, hydroxyl groups, $C_{1-6}$ alkoxide groups;
$R_4$ is selected from hydrogen, —COOH, —$CH_2CO_2H$ and a methyl group;
wherein said at least one copolymerizable (meth)acrylic monomers (a) is selected from:
i. hydroxyalkyl acrylic or methacrylic acid esters, wherein alkyl groups are have preferably 2-18 carbon atoms, most preferably 2 to 10 carbon atoms, such as 2-hydroxyethyl ethyl acrylate, 2-hydroxyethyl methacrylate, 2-hydroxypropyl acrylate, 2-hydroxypropyl methacrylate and mixture thereof;
ii. alkyl acrylic or methacrylic acid esters, wherein alkyl groups are have preferably 2-18 carbon atoms, most preferably 2 to 10 carbon atoms, such as n-butyl acrylate, n-butyl methacrylate, isopropyl acrylate, isopropyl methacrylate, n-hexyl methacrylate, 2-ethylhexyl acrylate and mixture thereof;
iii. alkoxyalkyl of acrylic or methacrylic acid esters, wherein alkyl groups are have preferably 2-18 carbon atoms, most preferably 2 to 10 carbon atoms, such as methoxyethyl acrylate, methoxyethyl methacrylate, butoxyethyl acrylate, butoxyethyl methacrylate and mixture thereof;
iv. monomers of formula (I)

$$R_1-(OCH_2CHR_7)_n-L-O(CO)-CR_6=CH_2 \quad (I)$$

wherein $R_5$ is hydrogen or a $C_1$-$C_6$ alkyl group, n is an integer from 1 to 100, L is a single bond or a divalent linking group, preferably a single bond or a $C_1$-$C_6$ alkylene group and $R_6$ is hydrogen or a $CH_3$ group, and $R_7$ is a hydrogen or a methyl group.

Monomers (a) of group (iv) are preferably selected from methoxypropyleneglycol acrylate, methoxypropyleneglycol methacrylate, methoxypolyethyleneglycol acrylate, methoxypolyethyleneglycol methacrylate, and mixture thereof.

Mixtures of monomers (i) to (iv) are also included and represent a preferred embodiment of the invention.

According to a preferred embodiment, copolymerizable (meth)acrylic monomers (a) is a mixture of methoxy polyethyleneglycol methacrylate, presently marketed as "Bisomer® MPEG 350MA", 2-ethylhexyl acrylate, methyl acrylate and acrylic acid.

According to a preferred embodiment, the copolymerizable (meth)acrylic monomers (a) is a mixture of methoxy polyethyleneglycol methacrylate, presently marketed as "Bisomer® MPEG 350MA", methacrylic acid, butyl methacrylate and/or 2-ethylhexylmethacrylate.

According to another preferred embodiment, at least one monomer (iv) is present in the composition, in admixture with one or more monomers (i) to (iii).

According to a preferred embodiment, copolymerizable non-acrylic monomers (b) include α,β-unsaturated monocarboxylic or dicarboxylic acids, preferably having X-X carbon atoms, as well as anhydride and alkyl or alkenyl esters thereof, wherein alkyl groups have preferably 1 to 3 carbon atoms and alkenyl groups have preferably 2-5 carbon atoms; examples of monomers (b) include acrylic acid, itaconic acid, maleic acid, maleic anhydride, ethyl methacrylate ester and fumaric acid;

vinyl monomers, such as, preferably, vinyl acetate, acrylonitrile, vinyl propionate, vinyl pyrrolidone, styrene alpha methyl styrene, ACMO (acryloyl morpholine) and styrene 4-sulfonic acid.

According to a preferred embodiment, X is S.

According to another preferred embodiment, $R_1$, $R_2$ and $R_3$ are hydrogen.

According to a preferred embodiment, $R_4$ is methyl. According to a preferred embodiment, the compound of formula (I) is 4-benzoyl-4'-(2-methyl-propenoyl)-diphenyl-thioether.

The term "solvent" (d) includes a mixture of solvents.

According to a preferred embodiment, the solvent (d) is selected from alcohols, ketones, ethers, aliphatic hydrocarbons, aromatic hydrocarbons, esters and mixtures thereof. Most preferred solvent are selected from methanol, ethanol, n-propanol, isopropanol, butanol, methyl acetate, ethyl acetate, propyl acetate, isopropyl acetate, butyl acetate, acetone, methyl ethyl ketone, hexane, heptane, cyclohexane and toluene.

According to a preferred embodiment, the solvent (d) is a mixture of an alcohol and an ester, advantageously ethanol/ethyl acetate, for instance in the ratio 55/45 ethanol/ethyl acetate (w/w).

The optional thermal initiator is preferably present and is preferably selected from azo compounds such as 2,2'azobis (isobutyronitrile) or peroxides such as benzoyl peroxide, t-butyl peroxy-2-ethylhexanoate, dilauryl peroxide or percarbonates such as di(4-tert-butyl cyclohexyl peroxydicarbonate).

It was surprisingly found that, with respect to the photoinitiators disclosed in EP2878606 which differ from the compounds of formula (I) above essentially in that X is an oxygen, the replacement of the oxygen atom with a sulfur atom results in a bathochromic shift. Indeed, it was observed that the substitution of the oxygen atom with a sulfur atom shifts the absorption to a longer wavelength (+31 nm) as shown in FIG. 1 and in the following Table:

| $\varepsilon$ ($M^{-1}$ $cm^{-1}$) | LFC3097 (O) | LFC3046 (S) |
|---|---|---|
| $\varepsilon_{282.6}$ | 27979 | |
| $\varepsilon_{246.8}$ | | 26723 |
| $\varepsilon_{313.0}$ | | 18413 |

LFC3097 (O)=4-benzoyl-4'-(2-methyl-propenoyl)-diphenyletherLFC3046 (S)=4-benzoyl-4'-(2-methyl-propenoyl)-diphenylthioether
ε=molar extinction coefficient This bathochromic shift could not be expected and represents an important advantage of the photoinitiators of formula (I), as novel long-wavelength photoinitiators are always investigated and required.

The composition of the invention may be prepared by reacting the components (a) to (e) above according to the general known polymerization procedures.

As an example, a reactor equipped with a stirrer, a thermometer, a condenser, a temperature controller such as heating, containing a solvent and a radical polymerization initiator (e) is heated and the components (a) and (b), or a solution of them, are fed to the reactor slowly. Preferably, the copolymerization, conducted under inert atmosphere such as nitrogen, is a batch process and the total conversion of the monomers is obtained in about 20 hours. Typically, but not necessarily, the solvent is removed at the end of reaction. The composition of the invention is thus obtained as a linear or branched random copolymer.

The process for the preparation of the composition represents another subject-matter of the invention as well as the composition thus obtained.

The invention also relates to a random copolymer obtainable and/or obtained by polymerizing the components (a) to (e) as above defined.

The invention also relates to a crosslinked product obtainable by irradiating the random copolymer of the invention.

The present invention is especially useful in the medical field. Indeed, the composition of the invention may be used as a PSA and shows excellent moisture vapor transmission and skin adhesion so that a high degree of flexibility and comfort for the patient is maintained.

The invention also relates to the use of the random copolymer of the invention as a pressure sensitive adhesive, preferably, for use with wound dressing.

The amount of the components in the random copolymer of the invention are preferably the following:
at least 2.5-40%, preferably 5-15%, for instance about 10%, of at least one monomer (a) of group (iv), in admixture with one or more monomers (a) of groups (i) to (iii), preferably of group (i), the total amount of monomer (a) being 65 to 95% by weight;
0 to 25% by weight of at least one copolymerizable non-acrylic monomer (b);
0.25 to 10% by weight or less of a copolymerizable photoinitiator (c);
0 to 1% by weight of a thermal initiator (e);
said percentages being based on the total weight of components (a), (b), (c) and (e).

Preferably, the solvent (d), if any, is present in an amount of 30 to 80% by weight, the total weight of components (a), (b), (c) and (d).

As an alternative, the solvent may not be present in the final composition, as it can be removed at the end of the process of preparation of the composition, as it will be seen below.

For its use, the random copolymer of the invention may be applied to a substrate as a hot-melt formulated, since the viscosity is reduced upon heating.

These random copolymer can be applied using a variety of coating methods, including brush, roll, spray, spread, wire, gravure, transfer roll, knife, doctor blade.

The thickness of the layer of the adhesive may vary over a broad range of about 10 micrometer to several hundred micrometer, with a preference between 10 micrometer to 100 micrometer.

After the random copolymer has been applied to a substrate, the copolymer is crosslinked by UV light, generating a high performing PSA. It is another object of the invention the use, according to claim 9, of a copolymerizable photoinitiator (c) of formula (I)

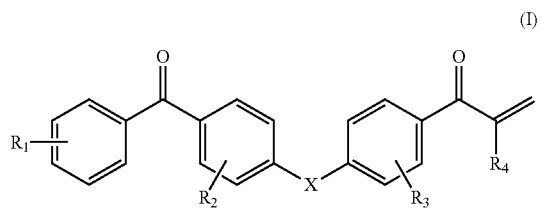

wherein
X is selected from S and NR';
R' is selected from hydrogen and linear or branched $C_{1-10}$ alkyl groups;
$R_1$, $R_2$ and $R_3$, each independently, are selected from hydrogen, $C_{1-6}$ alkyl groups, halogens, amino groups, nitro groups, nitrile groups, hydroxyl groups, $C_{1-6}$ alkoxide groups;
$R_4$ is selected from hydrogen, —COOH, —$CH_2CO_2H$ and a methyl group, in the preparation of a composition for a pressure sensitive adhesive.

Preferably in the compound of formula (I) X is S; $R_1$, $R_2$ and $R_3$ are hydrogen and $R_4$ is methyl. The composition may include a random copolymer according to claim 6 or 7, or a crosslinked product of claim 8.

A preferred adhesive is a pressure sensitive adhesive (PSA), preferably for wound dressing devices. Another object of the invention is a pressure sensitive adhesive (PSA) comprising a copolymer according to claim 13 and including a compound of formula (I).

By UV irradiation the excited state of the type II photoinitiator undergo a primary process of hydrogen atom abstraction from the environment (R—H) (for instance an adjacent linear or branched random copolymer) to produce a ketyl radical. At the same time, the abstraction of hydrogen leaves a radical in the copolymer and crosslinking between different polymer chains, or between polymer chains and ketyl, are formed.

The result is a polymeric three dimensional network on the substrate.

The pressure sensitive adhesive (PSA) obtained by irradiating the invention composition with UV irradiation has got a tridimensional network and its properties are changed. Indeed, by this UV irradiation the viscoelastic properties of the material are modified obtaining a better balance between adhesion and cohesion. The three dimensional crosslinking increases the viscosity and decreases the solubility but the formulation of crosslinked adhesive remains stable on the substrate.

The UV-irradiation conditions are well-known to the skilled in the art. Usually, UV-irradiation at wavelength between about 200 nm and about 400 nm is used. The UV intensity on the surface of the substrate carrying the layer of the random copolymer is typically within the range of 10-500 $mJ/cm^2$, preferably 20-100 $mJ/cm^2$.

The substrate or backing can be selected from a wide variety of materials.

Backing layer may be made of a thin polymer elastic or flexible membrane permeable to water vapor. Film may be a liquid and/or bacterial impermeable. Backing layer may be a polyurethane, an elastic polyester, blends of polyurethane and polyester, polyvinyl chloride, polyether—may include amide block copolymers and porous polyethylene.

In one embodiment, the backing is a polyurethane film.

A thin backing layer is preferred as it shows a good adaptability. A preferred thickness of the backing is in the range of about 10 micrometer to about 75 micrometer.

The invention also relates to a method for manufacturing an adhesive article, which comprises applying the random copolymer of the invention to a substrate or a backing and irradiating it with an appropriate light source, as above defined.

The invention also relates to an adhesive article comprising the random copolymer or the crosslinked product of the invention.

The invention is now illustrated by the following non-limiting examples.

EXPERIMENTAL SECTION

Example 1

Preparation of a PSA
Monomers:
50 g of Bisomer MPEG 350 MA (methoxy polyethyleneglycol methacrylate, average molecular weight 350 g/mol);
2 g of 4-benzoyl-4'-(2-methyl-propenoyl)-diphenylthioether;
283 g of 2-ethylhexyl acrylate, 140.0 g of methyl acrylate and 25.0 g of acrylic acid.

A thermo-radical initiator solution was prepared dissolving 0.8 g of t-butyl peroxy-2-ethylhexanoate in 140 g of a mixture 55:45 of ethanol/ethyl acetate. In a glass flask equipped with thermometer, mechanical stirrer, purged with nitrogen 80 g of solvent (composed with ethanol and ethyl acetate 1.22:1), 250 g of monomer mixture described above and 70.4 g of a catalyst solution were charged under stirring. The temperature was increased up to 77-80° C. The mixture was refluxed for 30 minutes and the remaining monomer mixture and the catalyst solution were uniformly added into the reactor over 90 minutes. At the end of the addition the monomer tank was washed with 50 g of a mixture 55:45 of ethanol/ethyl acetate and added into the reactor. The reactor was held at reflux for 1 hour. 3.5 hours after the star of feeding, a catalyst solution of 0.7 g of t-butyl peroxy-2-ethylhexanoate dissolved in 40 g of a mixture 55:45 of ethanol/ethyl acetate under stirring for 45 minutes. The internal temperature was maintained between 77 and 80° C. Finally 6.15 hours after the start of the feeding of monomer mixture the organic phase in the reactor was cooled and diluted with 148.5 g of a mixture 55:45 of ethanol/ethyl acetate.

The PSA thus obtained can be used as solvent-based adhesive or as hot melt adhesive after solvent evaporation.

Example 2

Evaluation of the Performances of the PSA

The PSA of Example 1, after solvent evaporation under vacuum. was used as a hot melt, to coat a sample with a coating weight of 30 $g/m^2$ onto a PET 36 microns film.

After crosslinking with a Hg-doped UV-C lamp, 30 $mJ/cm^2$ the adhesive performance was evaluated as follow:

| | Performance | UM | Value | Method |
|---|---|---|---|---|
| 1 | Peel ss 20 min | G/25 mm | 1075 | FINAT Test Method (FTM1) |
| 2 | QS ss | G/25 mm | 1220 | FINAT Test Method (FTM9) |
| 3 | Shear (½")² | min | 960A | FINAT Test Method (FTM8) |
| 4 | Shear (1")² | h | >100 | FINAT Test Method (FTM8) |

[1]The Peel adhesion (180° on stainless steel (ss)) at a dwell time of 20 min
[2]The loop tack (=QS ss) was measured on stainless steel
[3]The shear value was measured at room temperature using a weight of 1 kg at surface areas of 1 square inch ((½")²)
[4]The shear value was measured at room temperature using a weight of 1 kg at surface areas of 1 square inch ((1")²)

Example 3

Application Tests
Evaluation of the Photoinitiating Activity

Two clear formulations were prepared to evaluate the performance of two PSAs comprising different copolymerizable benzophenones:
- the PSA of the invention, comprising 4-benzoyl-4'-(2-methyl-propenoyl)-diphenylthioether as component (c) and
- a PSA not according to the invention, comprising 4-acryloyloxy-benzophenone (as comparative test).

To a mixture of bisphenol A epoxy diacrylate (Ebecryl® 605) (93.06%), and silicone diacrylate (Ebecryl® 350) (0.94%), the copolymerizable benzophenone (3%) and ethyl 4-(dimethylamino)benzoate (3%) are added under stirring to obtain a clear solution. The formulations are spread on a polyethylene support as a thick film of 6 µm with a bar coater and after UV exposure (Hamamatsu Lightningcure LC8 equipped with Hg/Xe lamp 200 W and intensity reduced to 20%) the IR spectrum (Jasco FT/IR 430) is recorded.

The experiments were carried out by measuring the areas of double bond peak (1408 cm$^{-1}$) after UV irradiations at different time. The percentage of polymerization was obtained according to the following formula:

$$\text{Conv \%} = [1-(A_t/A_{t^0})] \times 100$$

and the results are showed in Table 1:

| Photoinitiator in the PSA | % after 15 sec | % after 3 sec | % after 50 sec |
|---|---|---|---|
| 4-benzoyl-4'-(2-methyl-propenoyl)-diphenylthioether | 3.26 | 20.96 | 49.7 |
| 4-acryoyloxy-benzophenone (*) | 3.94 | 7.48 | 20.61 |

(*) comparative

The invention claimed is:

1. A method for preparing a pressure sensitive adhesive, said method comprising
polymerizing a composition comprising:
a. at least one copolymerizable (meth)acrylic monomer;
b. optionally, at least one copolymerizable non-acrylic monomer;
c. at least one copolymerizable photoinitiator;
d. optionally, a solvent; and
e. optionally, one or more non-copolymerizable photoinitiators;
wherein the at least one copolymerizable photoinitiator (c) is a compound of formula (I)

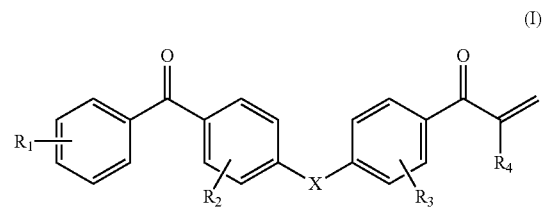

wherein
X is S;
$R_1$, $R_2$ and $R_3$, each independently, are selected from hydrogen, $C_{1-6}$ alkyl groups, halogens, amino groups, nitro groups, nitrile groups, hydroxyl groups, $C_{1-6}$ alkoxide groups;
$R_4$ is selected from hydrogen, —COOH, —CH$_2$CO$_2$H and a methyl group,
wherein said at least one copolymerizable (meth)acrylic monomers (a) is selected from:
methoxypropyleneglycol acrylate, methoxypropyleneglycol methacrylate, methoxypolyethyleneglycol acrylate, methoxypolyethyleneglycol methacrylate, and mixture thereof; or
a mixture of methoxy polyethyleneglycol methacrylate, 2-ethylhexyl acrylate, methyl acrylate and acrylic acid and a mixture of methoxy polyethyleneglycol methacrylate, methacrylic acid, butyl methacrylate and/or 2-ethylhexylmethacrylate.

2. The method according to claim 1, wherein said at least one copolymerizable non-acrylic monomers (b) is selected from α,β-unsaturated monocarboxylic, dicarboxylic acids, anhydride, alkyl or alkenyl esters thereof, wherein alkyl groups have 1 to 3 carbon atoms and alkenyl groups have 2-5 carbon atoms; acrylic acid, itaconic acid, maleic acid, maleic anhydride, ethyl methacrylate ester ethyl methacrylate ester, fumaric acid, vinyl monomers, vinyl acetate, acrylonitrile, vinyl propionate, vinyl pyrrolidone, styrene, alpha methyl styrene, ACMO (acryloyl morpholine) and styrene 4-sulfonic acid.

3. The method according to claim 1, wherein the solvent (d) is present and it is selected from alcohols, ketones, ethers, aliphatic hydrocarbons, aromatic hydrocarbons, esters and mixtures thereof and said one or more non-copolymerizable photoinitiators (e), if present, are selected from azo compounds, 2,2'azobis(isobutyronitrile), peroxides, benzoyl peroxide, t butyl peroxy-2-ethylhexanoate, dilauryl peroxide, percarbonates and di(4-tert-butyl cyclohexyl peroxydicarbonate.

4. The method according to claim 1, wherein $R_1$, $R_2$ and $R_3$ are hydrogen and $R_4$ is methyl.

5. A wound dressing device comprising a pressure sensitive adhesive obtained according to claim 1.

6. A wound dressing device comprising a pressure sensitive adhesive obtained according to claim 2.

7. A wound dressing device comprising a pressure sensitive adhesive obtained according to claim 3.

8. A wound dressing device comprising a pressure sensitive adhesive obtained according to claim 4.

* * * * *